Aug. 15, 1939. C. DE L. RICE 2,169,616
RAILWAY TRAIN
Filed Feb. 17, 1937 4 Sheets-Sheet 1

Inventor
CHARLES DeLOS RICE
By T. Clay Lindsey
Attorney

Aug. 15, 1939.  C. DE L. RICE  2,169,616
RAILWAY TRAIN
Filed Feb. 17, 1937  4 Sheets-Sheet 2
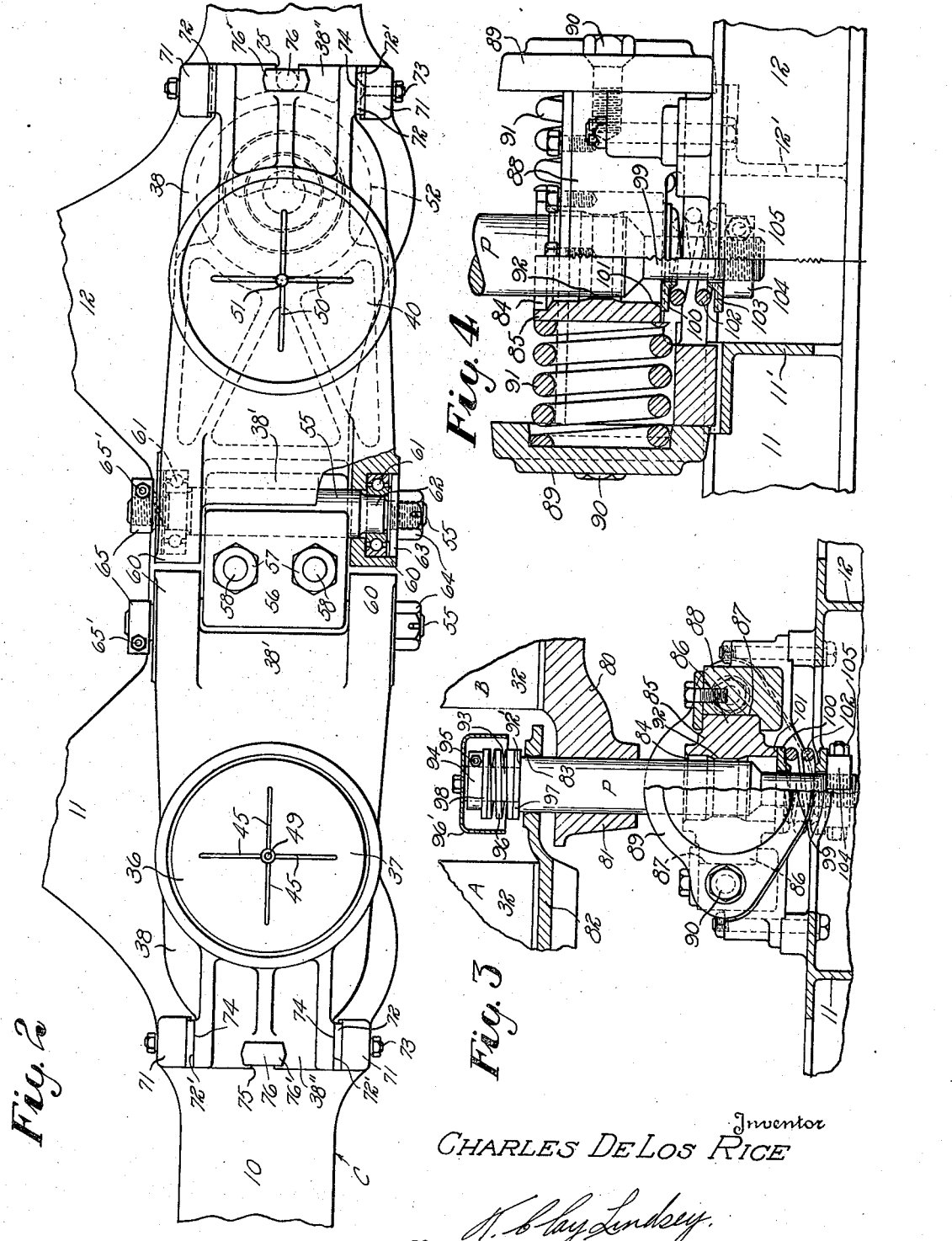
Inventor
CHARLES DeLOS RICE
By *N. Clay Lindsey*
Attorney

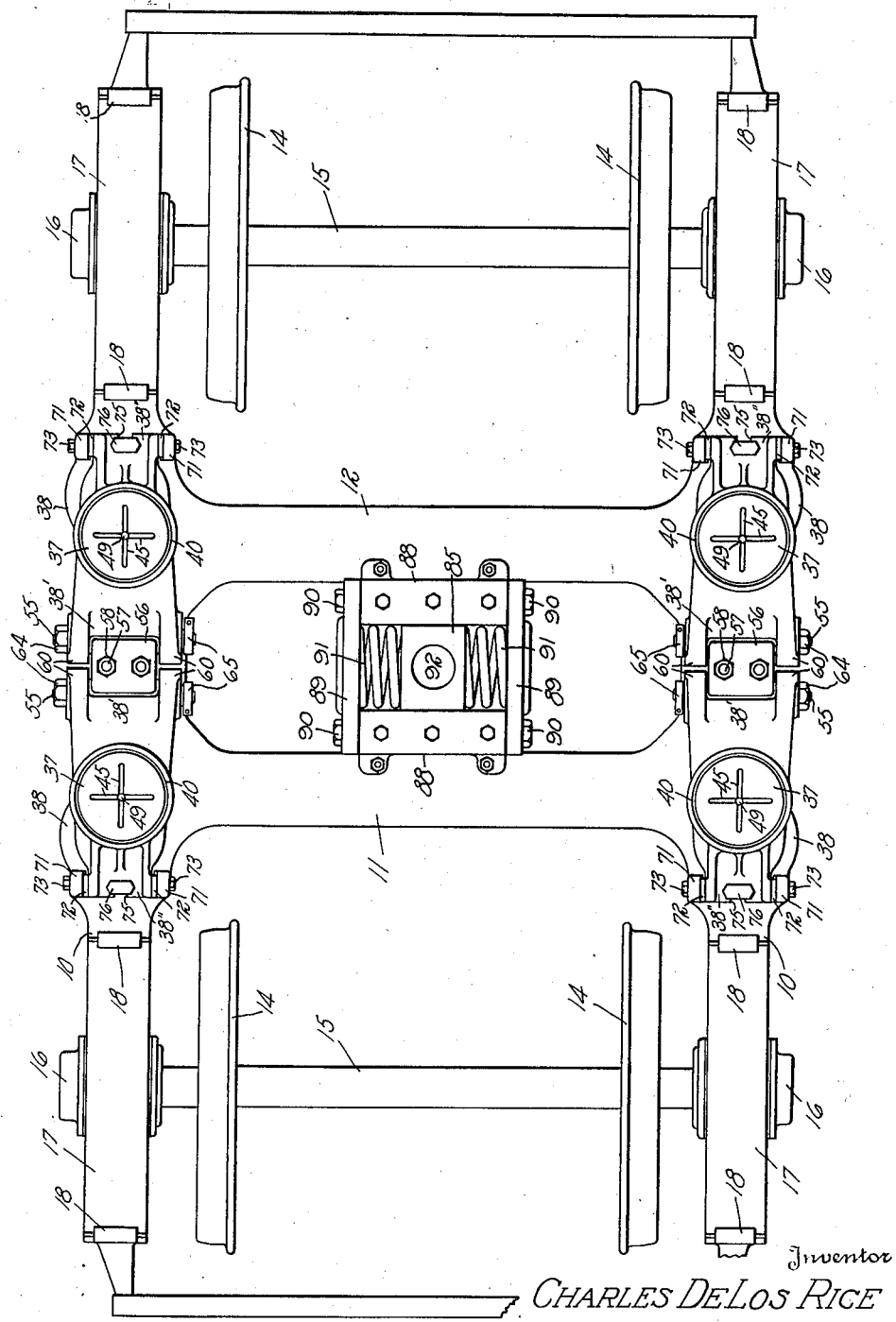

Aug. 15, 1939.                C. DE L. RICE                  2,169,616
                              RAILWAY TRAIN
                           Filed Feb. 17, 1937            4 Sheets-Sheet 4
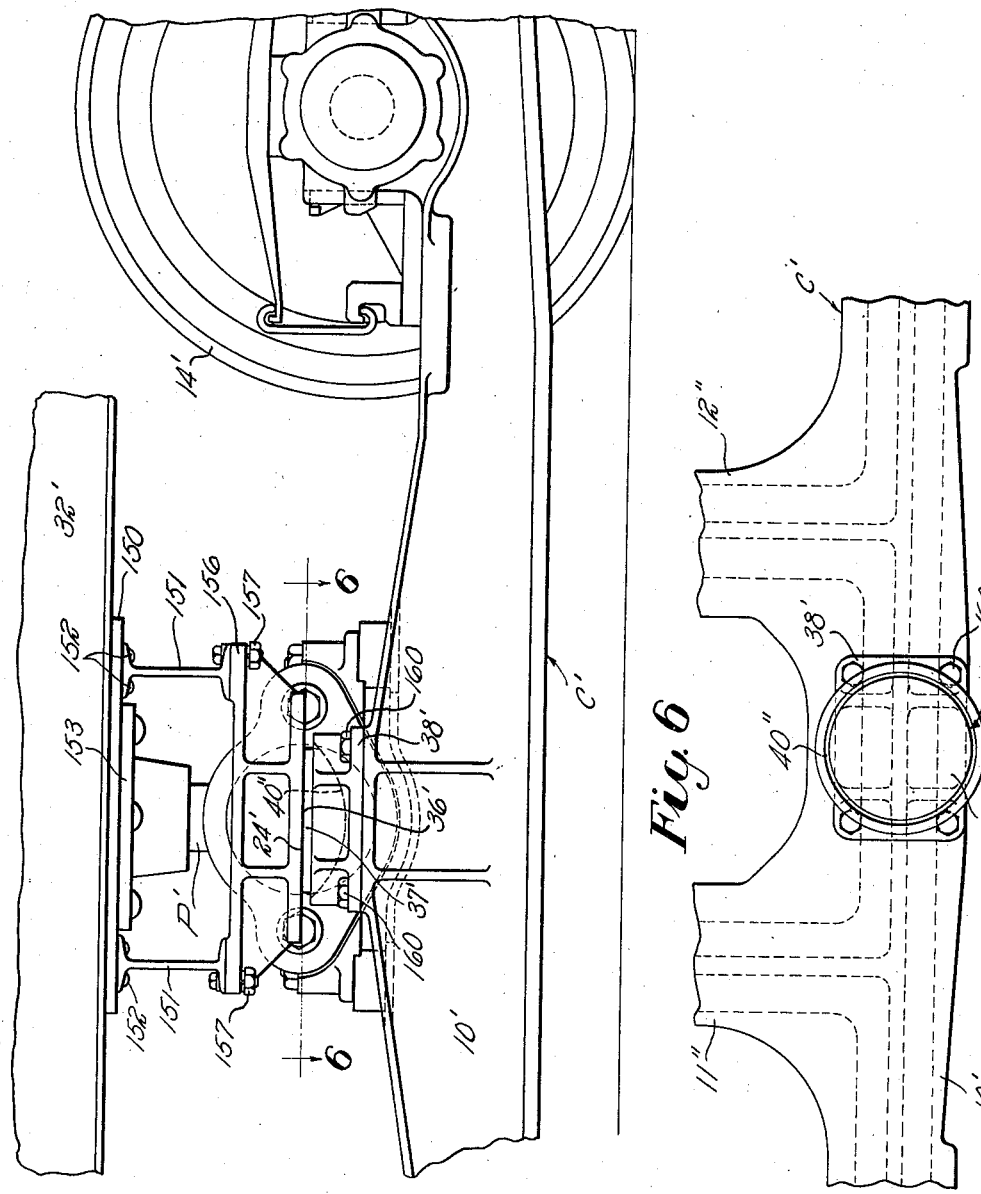
Inventor
CHARLES DeLos RICE
By /S. Clay Lindsey.
Attorney Patented Aug. 15, 1939

2,169,616

UNITED STATES PATENT OFFICE 2,169,616

RAILWAY TRAIN

Charles De Los Rice, West Hartford, Conn.

Application February 17, 1937, Serial No. 126,193

11 Claims. (Cl. 105—4)

This invention relates to improvements in railway trains.

It is the principal aim of this invention to provide an improved means to resiliently support the end of a railway coach so that all relative movements between the supporting truck and coach body are cushioned.

Another object of my invention is to provide a side bearing between each side of a coach body and a truck which supports the coach body and permits a relative lateral movement of truck and coach body.

A further object of my invention resides in the provision of an improved means for individually and laterally supporting the adjacent ends of two pivotally connected coach bodies upon a single car truck so as to allow a relative torsional movement of the coaches independently of each other.

A further object of this invention is to provide individual supports between adjacent ends of pivotally connected coaches and a single car truck so arranged that the supported coach ends may move laterally relative to the truck and to each other.

A further object of my invention is to provide a support between a coach body and a truck which will permit movement of the truck relative to the coach body so that the truck may easily follow a track.

A still further object of my invention resides in the provision of separate cushioned supports on the same truck for adjacent ends of each of two pivotally interconnected coaches so that the supports for each coach will individually and resiliently absorb the vertical and rocking movements transmitted to the truck in passing over uneven portions of a track.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Referring to the drawings illustrating one embodiment which the invention may take and wherein like numerals indicate like parts:

Fig. 2 is a fragmentary plan view taken along line 2—2 of Fig. 1;

Fig. 2a is a plan view of a car truck embodying the invention herein;

Fig. 3 is a fragmentary sectional view showing the pivotal connection between a car truck and the adjacent ends of two coach bodies;

Fig. 4 is a fragmentary enlarged showing of the mechanism for laterally and resiliently positioning the pivot pin on the truck;

Fig. 5 is a fragmentary side elevation of another embodiment of my invention arranged to support one end of a railway coach; and Fig. 6 is a fragmentary plan view taken along the line 6—6 of Fig. 5.

Figure 1:
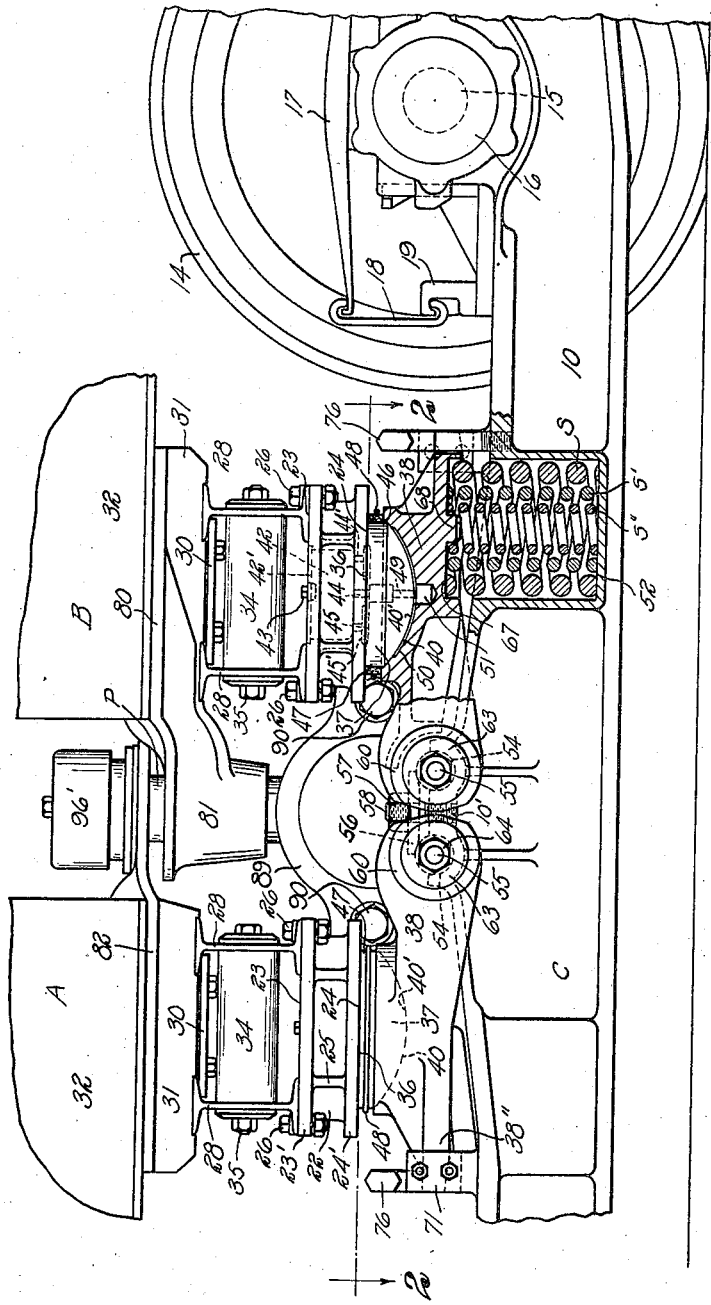
Figure 1 is a fragmentary side elevation of my invention with certain parts broken away to illustrate the construction.

In accordance with my invention, and referring more particularly to the embodiment illustrated in Figs. 1 to 4, I have provided a railway train and a truck therefor which provides an individually cushioned, free floating support for the pivotally connected adjacent ends of two coaches A and B in such a manner that vertical, rocking, or twisting movements of one coach do not tend to be transmitted to an adjacent coach, and these movements are individually compensated for and resiliently restrained in each coach support.

Referring to the drawings illustrating my invention, I have provided a car truck for articulated trains having a frame C which, in the present instance, may comprise an integral rigid steel casting having longitudinal side frame members 10 interconnected by cross members 11 and 12. The cross frame members are also interconnected and reinforced by webs 11' and 12' disposed longitudinally of the frame and to either side of its axis to aid in supporting a pivotal coach connection, as will be later described. The adjacent ends of coaches A and B are individually supported by side bearings and pivotally interconnected by a pin P supported on the frame C for lateral and vertical movements between frame members 11, 11', 12 and 12'.

The truck frame C is supported upon rail wheels in any suitable manner, as, for example, in a way similar to that shown in my prior Patent No. 2,017,259 issued October 15, 1935. In accordance with the present showing, 14 designates one of the wheels secured upon an axle 15. A journal box 16 receives the end of the axle, and a longitudinal spring 17, supported at its central portion on the journal box, is secured as by links 18 respectively located at its ends to hook brackets 19 fastened to frame member 10.

Each of the car or coach bodies A and B is individually supported for a freely cushioned movement upon the truck frame in such a manner that any rocking or twisting movement of one coach relative to an adjacent coach or to the truck therebeneath will not be transmitted to the other coach but will be automatically absorbed by a plurality of resilient supports. This arrangement further provides for a limited transverse sliding movement of the coach bodies relative to the truck. To accomplish these features, each corner of the adjacent ends of two pivotally interconnected coach bodies is provided with a side bearing including a block 22 having parallel upper and lower faces 23 and 24 terminating in flanges 23' and 24' interconnected by reinforcing ribs 25. Each upper flange 23 is fastened, as by bolts 26, to the bottom flanges of a pair of spaced I-beams 28 which, in turn, are secured, as by a clamping plate 30, to chassis members 31. Members 31 are fastened to the underside of longitudinally extending chassis members 32, and each pair of I-beams 28 is reinforced by one or more spacer sleeves 34 secured in position, as by bolts 35. Each block 22 has its lower flat face 24 slidably resting for a substantially floating movement upon the flat top face 36 of a bearing block 37 seated within a rocker arm 38 pivoted to the truck frame. Arm 38 has a recessed partispherical seat 40 adapted to matingly receive the partispherical underface 40' of bearing block 37, thus providing in effect a universal movement between each bearing block and its supporting arm. The extent of slidable floating movement of surfaces 24 and 36 and the extent of rocking movement of the bearing block 37 is limited by pin P and a resilient support for the pin as will be later described.

To provide lubrication for the mating surfaces 24 and 36 and 40 and 40', each block 22 contains an oil well 42 enclosed at its top by a cover plate 42' seated within face 23 and having a removable filler plug 43. This well may be filled with oil saturated waste or wicking which permits the oil to slowly seep therethrough. Drain holes 44 and 44' in the bottom of the well deliver oil to the contacting bearing surfaces 24 and 36 and a plurality of radially extending grooves 45 cut within surface 36 aid in distribution of the oil. Drain hole 44 normally overlies the intersection of grooves 45. I also preferably provide oil grooves 45' cut within surface 24 to aid in lubrication.

As shown in Figs. 1 and 2, the upper portion of each bearing block 37 which projects above seat 40 is substantially cylindrical and of a slightly smaller diameter than the maximum diameter of seat 40, thus providing an annular oil groove 46 in the top of each seat surrounding a bearing block. The upper cylindrical portion of member 37 is preferably surrounded by an annular member 47 which protects groove 46 and prevents grit and dirt from entering between bearing surfaces 40 and 40'. This wiper member is preferably composed of a material pervious to oil, such as a strip of soft felt, and is held in position by a band 48. An oil hole 49 passes downwardly through bearing block 37 from the junction of grooves 45 to surface 40'. Oil grooves 50 are cut within seat 40 to aid lubrication. A well 51 is provided in the bottom of seat 40 to collect dirt and foreign matter.

To uniformly and individually support the adjacent ends of coaches A and B on the truck frame C, each rocker arm 38 which individually supports a side bearing is pivotally supported at one end upon a side frame member 10, and the other end of the arm is supported by one or more coiled springs mounted in nested formation within a well 52 in member 10. The intermediate portion of each side frame member 10 between the wheel axles 15 has a reinforced raised portion 10' provided with a pair of transversely disposed spaced grooves 54 arranged to respectively support a pair of rocker shafts 55 intermediate of their ends. These shafts are both secured in position by a cap plate 56 clamped into overlying engagement therewith and held in position by nuts 57 threaded onto studs 58 mounted in the raised portion 10' between the shafts.

The inner end of each arm 38 is forked as at 38' and has a pair of ears 60 within which are mounted suitable bearings such as ball bearings 61 mounted on the reduced outer ends 62 of shaft 55. The outer ends 62 of each shaft project beyond ears 60 and support cover plates 63 which are in the general form of washers slightly clearing ears 60 adjacent to the bearings to maintain grease within the bearings and prevent the entrance of dirt. Nuts 64 and 65 respectively threaded on the ends of shafts 55 maintain the cover plates in desired adjusted positions. To facilitate adjustment and secure these nuts in adjusted positions, nuts 64 may be of the castellated type locked in position by cotter pins passing through the ends of the shafts, and nuts 65 may be split at one side and clamped in adjusted positions by lock bolts 65' transversely extending therethrough.

The wells 52 which preferably comprise cylindrical recesses in side frame members 10 are respectively located beneath the outer ends of the rocker arms, and each contains one or more coiled compression springs to resiliently support arms 38 for pivotal movement on shafts 55. In the present instance, three nested coiled springs S, S', and S'' are shown coaxially supported within a well and supporting a rocker arm, but it will be evident that any desired number or combination of springs of different sizes and of different compressive strengths may be interchangeably employed dependent upon the weight of the loaded car to be supported thereabove. The under side of each arm is provided with an annular recess 67 of substantially the same diameters as well 52 and normally in coaxial alignment above the well. This recess is adapted to slidably receive and axially locate the top convolution of outer spring S. A hub 68 projecting downwardly from the center of recess 67 is adapted to be received within and axially locates the inner spring S'' so that it is substantially central of spring S. The intermediate spring S' may be suitably located in position and, in the present instance, is simply inserted between the other two springs.

To prevent sidewise movement of the outer ends of arms 38, I preferably slidably locate the rearward end 38'' of each arm between a pair of spaced vertical guides 71 projecting upwardly from a side frame member 10. As shown in Fig. 2, the inner sides of guides 71 have wear plates 72 removably secured thereto as by bolts 73. These plates, which may be of any suitable wear-resistant material such as manganese steel, have smooth vertical faces 72' slidably engaged by similar vertical parallel faces 74 on end portion 38''. The intermediate portion of the outer end of each arm is further provided with an open end slot 75 slidably receiving the vertical body portion of a T bolt 76 threadably received in frame member 10 at its lower end. The upper end of each T bolt has a laterally extending head 76' overlying the top of each slot 75 in spaced relation to and limiting the extent of upward movement of the arm so that the coiled springs within well 52 cannot move out of operative positions.

The coaches A and B are pivotally connected by a pin which is pivotally and slidably fastened to the truck frame and serves to pivotally interconnect the abutting coach ends and cushion the relative rocking and vertical movement of the coaches without restricting individual movements of the coaches and car truck therebeneath, thus permitting the truck to freely rock and twist as it follows the track without normally transmitting such movements to the coaches. The pivotal connection is also arranged for a limited transverse sliding movement which yieldably permits a relative transverse movement of the coach bodies and truck. Hence, when the truck wheels 14 encounter a curve in the track, the pivotal connection yieldably moves laterally of the truck to absorb side thrusts on the coach bodies and ease the pressure between the wheel flanges and the outside rail of the track. At this time, the contacting surfaces 24 and 36 assume an arcuate movement about pivot pin P and a relative transverse sliding movement in response to the yieldably restrained transverse movement of the pivotal connection. Coach B has a coupling 80 rigidly secured to the under sides of chassis member 32. This coupling has an outwardly projecting sleeve portion 81 within which pivot pin P is tightly pressed for integral movement therewith. Coach A has a coupling 82 similarly secured to the under side of a chassis member 32 and projecting outwardly therefrom to slidably receive pin P above sleeve 81. The outward projection of coupling 82 has a vertical axially convexed bearing 83 provided with its smallest diameter intermediate of its ends and slidably engaging pin P to compensate for relative vertical and pivotal coach movements of the interconnected coaches A and B.

Pivot pin P is further arranged for lateral and vertical sliding movements and slight rocking movement within its truck support. To accomplish this, the pin is slidably and axially received intermediate of its ends within the hole 84 of a bearing block 85 mounted for lateral slidable movement on the truck frame. The bearing block is provided with outwardly projecting arms 86 respectively disposed towards the front and the rear of the truck and slidably received in transversely extending guideways 87 in a support 88 bolted to the saddle portion of the truck frame formed by members 11, 12, 11', and 12'. The ends of support 88 towards each side of the truck are provided with cap plates 89 secured in position as by screws 90, and coiled springs 91 are mounted in respectively opposed relation between the cap plates and bearing block to slidably and yieldably position the block and pin P substantially centrally of the truck. Intermediate of the ends of hole 84 in block 85, I provide a convex annular reduced bearing portion 92 having its smallest diameter intermediate of its ends and receiving pin P for a combined sliding and rocking movement similar to the relation of pin P with bearing 83.

Pivot pin P axially slides through bearings 83 and 92 with a resiliently restrained, substantially vertical floating movement to compensate for relative vertical and torsional movements of adjacent interconnected coach ends without transmitting these movements between the coaches. The upper end of the pivot pin has a shoulder 92' and terminates thereabove in a reduced portion 93 ending in a screw thread upon which is mounted an adjustable clamping nut 94 locked in position as by a bolt 95 transversely extending therethrough. A coiled spring 96 surrounds reduced portion 93 and is supported at its lower end by a collar 97 abutting shoulder 92', and at its upper end it resiliently engages a collar 98 beneath nut 94. Spring 96 and the associated parts are protected by an inverted cup member 96' secured to the upper end of pin P as by a cap screw. The lower end of pin P beneath bearing 92 has a reduced portion 99 projecting below the bottom of the slidable bearing block 85. This reduced portion slidably receives a flat faced washer 100 which is spring pressed into slidably frictional engagement with the bottom flat annular face 101 of the bearing block 85 by means of a spring 102. The lower end of spring 102 is supported by a similar collar 103 journalled on reduced portion 99 and adjustably secured in position by means of a nut 104 threaded on the bottom of the pin P and clamped in adjusted position by a transversely extending clamping bolt 105. Pin P is initially located within sleeve 81 so that collar 97 normally lies slightly above and overhangs the top of bearing 83, as shown in Fig. 3, and springs 96 and 102 are initially adjusted under sufficient compression so that whenever the adjacent ends of coaches A and B move in vertical relation the sliding movement of bearing 83 and pin P results in yieldable abutting engagement of the top of bearing 83 with collar 97 and a consequent further compression of the springs.

Springs 96 and 102 are easily regulated to provide the desired extent of vertical cushioning movement to coaches A and B by adjustment of nuts 94 and 104. The lateral movement of pin P is normally urged to a position centrally of the truck so that the surfaces 24 and 36 are free to slide upon each other with a substantially free floating movement and are urged to substantially horizontal positions with oil holes 44 and 49 in alignment. It will thus be appreciated that the bearing blocks 37 are free to individually move and support the coach bodies irrespective of their positions and the coach bodies are normally urged to horizontal positions. Hence, the coaches A and B are free for individual relative rocking movement as well as individual vertical movement, and a torsional movement of one coach will not be transmitted through the pivot pin to the other coach. Normally, the side bearing supports and the spring mounts for pivot pin P will permit the truck to follow rough and uneven portions of a track with a consequent movement of the truck relative to the coach bodies without transmitting uneven movements to the coaches.

The embodiment of my invention shown in Figs. 5 and 6 is generally similar to the construction previously described in Figs. 1 to 4, with the exception that the car truck as herein illustrated is intended to be located completely beneath and to pivotally support only one end of a coach body. Hence, trucks of this construction may be employed at each end of each coach body so that the coaches may be disconnected from the train and individually moved about for convenience in switching, turning a train around, or for coupling various cars into a train. Furthermore, trucks of the type illustrated in Figs. 5 and 6 may be employed at each end of an articulated train and the pivotally interconnected ends of the coaches may be supported by trucks of the type previously described with relation to Figs. 1 to 4.

To the accomplishment of these results, I have provided a car truck frame C' generally similar to frame C and resiliently supported on car wheels 14' in an identical manner. The longitudinal side frame members 10' are interconnected by cross members 11" and 12", and reinforcing webs connecting these cross members support a laterally slidable central bearing block which is spring urged centrally of the truck in the same manner as previously described and illustrated in Figs. 3 and 4. Each coach body is provided with a longitudinally extending chassis member 32' interconnected by a plate 150 and transversely extending I beams 151 as by rivets 152. A flange 153 is rigidly secured, as by rivets, to the under side of plate 150 between the I beams and centrally of the coach in a transverse direction. A depending pivot pin P' rigidly secured at its upper end within said flange is pivotally received for universal movement in the central bearing block at its lower end in the same general manner as pivot pin P is received in bearing 84 (Figs. 3 and 4). The lower end of the pivot pin extends downwardly and freely through the bearing and need not be secured in position by spring means as previously described.

The coach body to each side of pivot pin P' is supported by a side bearing, generally similar in construction and purpose to the side bearings previously described with relation to each corner of the adjacent ends of the interconnected coach bodies. To accomplish this, each side bearing includes a member 156 secured, as by bolts 157, beneath the ends of the I beams and above a truck frame side member 10'. Each member 156 has a bottom flat face 24' slidably mounted for a substantial floating movement on the flat top face 36' of a circular bearing block 37' slidable within a parti-spherical seat 40" in support 38' respectively secured, as by screws 160, on a longitudinal frame member 10' between its ends. Lubrication between the contacting faces of members 156, 37' and 38' may be accomplished in the same manner as previously described with relation to members 22, 37, and 38, and face 24' overlies face 36' sufficiently so that as the truck is pivotally moved a sliding and supporting relation of member 156 on block 37' is always maintained.

It will be appreciated that these side bearings operate in the same general manner as described with reference to my previously mentioned side bearings and will permit of a free transverse slidable movement of surfaces 24' and 36'. Furthermore, each block 37' is free to assume a universal sliding movement within its seat so that the side bearings will tend to uniformly support the coach body thereabove at all times irrespective of the truck frame movement in response to variations in roadbed or uneven portions of track.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a railway train, a coach having a coach body, a truck located beneath an end of the coach body, a pivot pin depending from the end of the coach body, a member supported for lateral sliding movement on the truck, said member pivotally receiving the pivot pin and arranged for a longitudinal and transverse rocking movement of the pin therein, yieldable means urging said member to a predetermined position of its movement on the truck, and means independent of said pivotal connection for supporting the coach end on the truck and providing for individual transverse and rocking movements of the truck with respect to the coach body.

2. In a railway train, a coach having a coach body, a truck located beneath an end of the coach body, a substantially vertical pivot pin pivotally connecting the coach end and the truck, a member supported for lateral sliding movement on the truck and receiving the lower end of said pin for a free floating universal movement, yieldable means urging said member to a predetermined position on the truck, a plurality of bearing blocks secured between the coach body and the truck and cooperatively supporting the coach body on the truck, said blocks individually supporting the portion of the coach body above the truck in such manner that the coach body will normally be supported in a horizontal position and the truck will be free to move in a relative pivotal, transverse, and rocking relation thereto.

3. In a railway train comprising a plurality of coaches in tandem relation, a single truck located beneath the adjacent ends of a pair of said coaches, a substantially vertical transversely slidable pivot pin flexibly secured to the truck, means securing the adjacent ends of two of said coaches to the pivot pin for relative pivotal movement, a plurality of bearing blocks secured beneath each of the adjacent ends of said coaches and individually supporting said coaches for transverse slidable movement thereon, and means yieldably supporting each bearing block for a universal rocking movement.

4. In a railway train comprising a plurality of coaches in tandem relation, a single truck beneath the abutting ends of a pair of adjacent coaches, a transversely movable pivot pin supported by the truck and pivotally interconnecting said coach ends, rocker arms respectively located beneath the adjacent coach ends and having part-spherical seats therein, a bearing block slidably mounted in each seat and supporting the coach thereabove for vertical and lateral movement, and resilient means yieldably supporting each rocker arm.

5. In a railway train comprising a plurality of coaches in tandem relation, a single truck located beneath the adjacent ends of a pair of said coaches and pivotally interconnecting said coaches, rocker arms respectively located beneath the adjacent coach ends and having parti-spherical seats therein, means pivotally securing said rocker arms to the car truck at positions remote from said seats for movement of said arms towards and from the truck, a bearing block slidably mounted in each seat and supporting the coach thereabove, a spring on the truck yieldably supporting each rocker arm, and means limiting the extent of movement of each rocker arm under influence of said springs.

6. In a railway train comprising a plurality of coaches in tandem relation, a single truck beneath the abutting ends of a pair of adjacent coaches, a pivot pin supported by the truck and pivotally interconnecting said coach ends, rocker arms respectively located beneath the adjacent coach ends and having parti-spherical seats therein, a bearing block slidably mounted for universal movement in each seat and supporting the coach thereabove, means pivotally supporting one end of each rocker arm for individual rocking movement towards and from the truck, guiding means slidably engaging the other end of each rocker arm and preventing its lateral movement, resilient means yieldably supporting each rocker arm, and means limiting the extent of rocker arm movement under influence of said resilient means.

7. In a railway train having a plurality of coaches in tandem relation, a single car truck beneath the abutting ends of a pair of adjacent coaches, a pivot pin supported for a combined axial floating and transverse movement on the truck and pivotally interconnecting said coach ends, rocker arms respectively located beneath the adjacent coach ends and individually pivoted to the car truck, each rocker arm having a partispherical seat, a bearing block mounted for universal movement in each seat, means arranged for freely slidable movement on the bearing block and supporting a coach body thereabove, and a coiled spring located between each rocker arm and the truck frame to resiliently support the coach bodies.

8. A train comprising a plurality of coaches in tandem relation, a single truck located beneath the adjacent ends of each pair of coaches, a substantially transversely movable vertical pin pivotally connecting the adjacent coach ends to the truck, means resiliently supporting the pin for floating axial movement relative to the truck to compensate for relative vertical movements of the coaches, and means independent of the pin for individually and resiliently supporting each coach body on the truck for free transverse and vertical movements.

9. In a train having a plurality of coaches in tandem relation, a truck beneath a pair of adjacent coach ends, pivot pin supported by the truck and arranged for limited vertical and rocking movements, resilient means engageable with the pivot pin permitting a floating movement thereof, means on said pin connecting the adjacent coach ends and permitting relative pivotal rocking and vertical coach movements, a bearing engaging the pin, means resiliently and slidably positioning the bearing transversely on the truck frame, and means independent of said pin for resiliently supporting the adjacent coach ends for sidewise, pivotal, and vertical movements relative to the truck whereby the truck may easily follow uneven track portions and the coach bodies will be uniformly supported.

10. A train comprising a plurality of coaches in tandem relation, a single truck pivotally connecting the adjacent ends of two coaches, yieldable means permitting a movement of the pivotal connection transversely of the truck, a pair of rocker arms respectively located beneath the adjacent ends of each coach body, pivotal means supporting one end of each rocker arm, resilient means between the other end of each rocker arm and the truck, a seat within each rocker arm, a bearing block received in each seat and forming a substantial ball and socket connection therewith, and a member arranged for free slidable movement on each bearing block and arranged to support a portion of the end of each coach for movement about the pivotal connection and laterally of the truck.

11. In a train having a plurality of coaches in tandem relation, a single truck beneath and pivotally connecting a pair of said adjacent coach ends, said pivotal connection including a bearing block and a substantially vertical pivot pin journalled in the block, means slidably supporting said block on the truck frame for movement transversely of the frame, yieldable means urging the block to a predetermined position in its movement, a pair of rocker arms respectively located beneath each of said adjacent coach ends, pivotal means interconnecting each rocker arm with the truck for substantially vertical movement, a plurality of compression coiled springs between each rocker arm and the truck to resiliently support said rocker arm, each rocker arm having a seat, a bearing block slidably received within each seat and forming a substantial ball and socket connection therewith, and coach supporting members respectively secured beneath said adjacent coach ends supported by and arranged for slidable movement on each bearing block whereby the connected coaches are free to individually rock, pivot, and move vertically relative to each other and move laterally of the truck.

CHARLES DE LOS RICE.